Patented May 25, 1954

2,679,478

UNITED STATES PATENT OFFICE 2,679,478

DRILLING MUD

Paul W. Fischer, Long Beach, and Raymond A. Rogers, Wilmington, Calif., assignors to Union Oil Company of California, Los Angeles, Calif., a corporation of California No Drawing. Application January 4, 1947, Serial No. 720,304

16 Claims. (Cl. 252—8.5)

This invention relates to the treatment of drilling fluids such as are employed in the drilling of oil and gas wells.

In general a drilling fluid particularly that employed for rotary drilling operations, which is also termed a "drilling mud" or simply "a mud," is a colloidal suspension of a suspending agent such as bentonite or other suitable clays in water to which other materials such as barium sulfate may be added in order to increase its apparent specific gravity. The physical characteristics of these clay suspensions are largely determined by the properties of the individual clay particles, most important of which are size, shape and surface characteristics.

Until recently it has been considered that the principal functions of a mud in drilling operations are threefold: it should form a cake on the wall of the hole; it should retain in suspension the cuttings formed so that the latter may be removed from the hole along with the mud; and it should possess sufficient weight to overcome any pressure encountered during drilling. These functions are considered in more detail below.

One of the primary difficulties encountered in the drilling of wells is that due to the sloughing or caving into the hole of the formations penetrated. The use of a drilling mud is supposed to lessen the tendency for caving by "mudding-off" the formations, that is, forming a cake on the walls of the hole. It is recognized, however, that drilling fluids prepared from natural clays vary widely in their ability to prevent sloughing of formations and that those fluids which form a thin gelatinous cake on the walls of the hole and have a minimum tendency to lose water to the surrounding formations are the most desirable.

In order for drilling to proceed smoothly, means must be provided for continuously removing the cuttings from the hole and to this end drilling mud is circulated through the hole. The mud must be of sufficiently low viscosity to allow it to be readily pumped and it should be thixotropic. Thixotropy is that property of colloidal suspension which involves an increase in gel strength as a function of the time of quiescent standing. This property is valuable in that it prevents, to a large extent, the sedimentation of the cuttings in the hole during periods of suspended circulation. However, immediately after violent agitation, such as is induced by the circulation of the mud, cuttings will settle a short distance and this fact is utilized for their removal in a settling tank provided for the purpose and in which the degree of agitation is suddenly lowered to practically zero. Normally, a mud which has proper wall building characteristics and is pumpable will have adequate thixotropic properties.

Obviously, the total weight of a mud must be sufficiently great to prevent blow-outs from any high pressure formations that may be encountered, but beyond this point, the need for greater weight is problematical. A rapid reduction in the hydrostatic head maintained on formations, caused by a reduction in the specific weight of the mud or by permitting the level of the mud in the well to fall while removing the drilling tools from the hole may cause dangerous caving. Therefore, mud is usually pumped into the well while removing the drill string in order to maintain a substantially constant hydrostatic head on the formations being drilled and the mud gravity is always kept as constant as practical. In general, the practice has been to keep the weight of mud only sufficiently high to prevent blow-outs. It is common practice to increase the specific gravity of a mud by adding finely ground insoluble materials of high density, such as for example, barium sulfate, iron oxide, etc. Because of their insolubility, the usual weighting agents employed have little effect on the performance characteristics of a mud.

Of the various characteristics of a drilling mud, the most important is its tendency to lose water to the formation. It has been found that the structural strengths of most formations which are penetrated during drilling are sufficient to prevent the walls of the hole from caving, but that many such formations are weakened from being saturated or even partially saturated with water. Frequently such action causes sloughing of the formation into the hole with a resultant seizing of the drill pipe or tools so that they cannot be removed and costly fishing jobs result. It is, therefore, of the greatest importance to prevent loss of water from the drilling mud to the formations drilled. The ideal drilling fluid should permit very little if any loss of water to the formation and should deposit only a relatively thin mud cake on the walls of the hole.

As has been mentioned hereinabove, the most important physical characteristic of a drilling mud is its ability to form a thin impervious cake on the walls of the hole thereby sealing formations against infiltration of water. The terms cake-forming and water-loss properties, sealing properties and, as will be brought out hereinbelow, filtration characteristics or filter rate are used synonymously throughout this specification to denote this characteristic.

A measure of the tendency for a mud to lose water to the formations being drilled and to form a thin impervious cake upon the wall of the hole can be obtained by means of a simple filtration test. In fact, the sealing properties of the mud are almost entirely dependent upon the character of the mud-cake formed when the latter is pressed against a membrane or filter permeable to water and are very largely independent of the character of the membrane or filter employed. As a consequence, the "filtration rate" of a mud becomes of prime importance in determining the quality of the mud.

The procedure for determining filtration rate is described in "Recommended Practice on Standard Field Procedure for Testing Drilling Fluids," A. P. I. Code No. 29, second edition, published July 1942, page 11, and consists in measuring the total volume of filtrate water obtained during a given time interval of pressure filtration. The amount of filtrate obtained in the first five minutes of filtration can be used as an indication of the relative quality of various muds. A more accurate evaluation is obtained from the volume of filtrate collected in the first fifteen minutes of filtration. An even better procedure is to determine the total volume of filtrate in the first hour of filtration. Numerous correlations between such tests and actual drilling experience with the same muds have shown that the muds yielding a total filtrate of less than 30 ml. in the first hour's filtration period are usually very satisfactory. On the other hand, muds yielding a total filtrate in excess of 45 ml. under similar circumstances have been found dangerous to use, particularly when drilling through formations which are readily softened by penetration of water, as cave-ins are liable to occur. Under some circumstances, particularly when drilling surface formations, or formations at moderate depth, the permissible maximum filtration rate of the mud may be as high as about 55 ml. of total filtrate in the first hour of filtration. A mud which yields a total filtrate of 30 ml. in the first hour's filtration period will yield about 7 ml. of filtrate in the first five minutes and about 15 ml. of filtrate in the first fifteen minutes of filtration. Similarly a mud which yields a filtrate of 45 ml. in the first hour of filtration will give approximately 11 ml. in the first five minutes and about 22 ml. in the first fifteen minutes of filtration. A mud which is satisfactory for drilling operations will under the conditions of this test, deposit a filter cake of not over one-quarter inch preferably one-eighth inch, in thickness and of a soft, plastic or gelatinous texture, whereas muds exhibiting unsatisfactory filter rates tend to deposit a thick, tough mud cake. Normally, as has already been mentioned hereinabove, muds possessing acceptable filtering characteristics form good mud cakes and, therefore, in practice only the "filtering rate" is ordinarily observed.

From the foregoing, it may be concluded that in preparing or treating a drilling mud in order to endow it with properties which will tend to insure satisfactory performance in the field, it is desirable that the treated mud when tested, as above described, yield a total filtrate of not over 55 ml. in the first hour of filtration, and preferably less than 30 ml. of filtrate, and that the deposited cake be preferably less than one-eighth inch in thickness and of a soft gelatinous texture.

As has already been mentioned hereinabove, a mud in order to be usable, must be capable of being readily and easily circulated by means of the pump which is ordinarily employed for the purpose in the field. From a practical standpoint, it has been found that within certain limits the more readily the mud can be circulated, the faster will drilling proceed. With many muds it has been observed that if their Marsh funnel viscosities, as determined by the 500 ml. in and 500 ml. out method, is in excess of 55 seconds they may exhibit impaired circulation rates with presently used equipment. On the other hand, it has now been observed that certain materials when added to control water loss may result in muds having viscosities in excess of 55 seconds but which are readily pumpable in actual practice.

In so far as the drilling operation and the subsequent production rate are concerned the most important characteristic of a drilling mud is its filtering rate and the viscosity of the mud need only be such that it is pumpable. Throughout this specification and the claims, wherever the terms "viscosity," "Marsh viscosity," "apparent viscosity" or "funnel viscosity" are employed, they relate to the viscosity as determined by means of the above test, a description of which can be found in "Recommended Practice on Standard Field Procedure for Testing Drilling Fluids," A. P. I. Code No. 29, second edition, published July 1942, page 6, except that 500 ml. of mud is measured into the funnel and the time determined for the 500 ml. to run out.

It is, therefore, one of the objects of this invention to provide for a treatment of a drilling mud which will cause the latter to have a "filtration rate" of less than approximately 45 ml. and at most not more than 55 ml. in the first hour of filtration, said treated mud having a viscosity sufficiently low so that it is pumpable. When the viscosity of the mud is sufficiently low to permit it to be readily circulated and the filtration rate is within the limits described hereinabove, the mud will ordinarily possess sufficient thixotropic properties for all practical purposes.

It is another object of this invention to provide for a treatment of a drilling mud containing an added water soluble salt resulting from the reaction of an alkali metal or an alkaline earth metal or other polyvalent metal with a strong mineral acid, such as for example sodium chloride, potassium sulphate and calcium nitrate, said treatment causing the "salt base" mud to have a filtration rate of less than approximately 45 ml. and at most not more than 55 ml. in the first hour of filtration said treated mud being pumpable.

It is another object of this invention to provide a relatively bacterial stable treatment of a drilling mud containing added salts resulting from the reaction of the previously described metals and a strong mineral acid.

As considerable research has been done to develop additive agents which will reduce loss by filtration of salt base drilling fluids, a considerable number of materials are available for this use such as starch, gelatinized starch, natural gums, saponified gums, mosses, and meals produced from seeds which have substantial percentages of mucilaginous materials; however, all of these materials are particularly susceptible to bacterial and enzymatic action of organisms that are present in these muds.

The present invention is concerned with the use of a water dispersible cellulose, preferably methyl cellulose, a material that is considerably more resistant to microorganisms than any of the starch and gums previously disclosed, as dispersing aids for use in drilling muds either in the presence and absence of salt.

It is another object of this invention to increase the productivity of oil wells by the use of a drilling fluid that will lose to the productive zones a fluid that will increase the effective permeability of the sands and not decrease it as do filtrates from conventional muds.

It is well known that: (1) oil sands, particularly those found in California, contain small amounts of clay. These sands also contain interstitial water occupying from 10% to 40% or more of the pore space with the remaining space being occupied by oil and gas. (2) The clays contained in the oil sand are of the base exchange type, that is, they contain small amounts of replaceable cations. If the clays are in contact with water containing relatively large proportions of sodium ion, the replaceable cation in the clay will be largely sodium. Similarly, if the environment consists predominantly of a polyvalent ion, such as calcium or magnesium, the replaceable cation in the clay will be polyvalent. Clays with either polyvalent or monovalent replaceable cations will swell in fresh water. However, the polyvalent type clay is much less susceptible to swelling than clay with a monovalent replaceable cation. Furthermore, either the monovalent or divalent type clay will be flocculated and its swelling characteristics destroyed or greatly diminished by the presence of a strong electrolyte. (3) The interstitial water usually contains relatively large amounts of soluble salts which in California may contain as much as 3% of the water in question. The ratio of sodium to calcium in these salts is relatively high and for purposes of illustration will be assumed to be about 13 to 1. In the above ratio the magnesium content of the water has been calculated to the chemical equivalent amount of calcium and in subsequent discussions of calcium in the interstitial water it will be assumed that the magnesium content of the water is included in the calcium.

The above factors influence the production of oil from wells approximately as follows: If the drilling fluid is a conventional water base mud containing relatively small amounts of electrolytes the water lost from the drilling fluid to the formation tends to swell the clays in the formation and has little influence on the cation in the clay, thus it decreases effective permeability and impairs productivity.

This invention overcomes this difficulty by incorporating in a water base mud an amount of a polyvalent ion, such as calcium, such that the water lost to the productive formations will increase the ratio of calcium to sodium in the interstitial water. The calcium ion should also be added in sufficient amount to cause flocculation of the clay. Polyvalent ions are much more effective in flocculating clays than monovalent ions and, therefore, a much lower concentration of calcium is required to effect flocculation than if monovalent ions, such as sodium, are used. Thus, when water is lost from the mud to the productive formation, the equilibrium relations between replaceable cations in the clay and the liquid environment will be disturbed so that all or part of the monovalent ions in the clay will be replaced by divalent ions, thus converting the clay in the formation to a non-swelling type. In addition, the excess electrolyte present in the water contacting the clays will tend to flocculate and still further reduce the swelling properties of the clay.

Both of these actions will increase the effective permeability of the oil sands and increase their ability to produce oil in the well bore.

In the past, efforts to accomplish this result have been confined largely to the additions of relatively large amounts, in excess of 3%, of sodium chloride to the water used in making the drilling mud and depending solely on the flocculating effect of the strong electrolyte thus produced. Results of the field tests using such muds have been encouraging, indicating that the flocculating effects were valuable and exceeded the deleterious action of converting part of the clay to the sodium or monovalent type; however, muds of this type have many disadvantages some of which may be enumerated as follows: (1) the high concentration of the electrolyte decreased the electrical resistance of the mud to such an extent that electric logs of the wells are of little value. (2) The use of conventional mud treating chemicals, such as sodium tetrapyrophosphate and quebracho, which are used to decrease water loss is impractical. If these materials are used the resulting mud will lose excessive amounts of water to drilled formations causing caving and stuck drill pipe. Until recently the only solution was to use a colloid, such as gelatinized starch in amounts in the general range of 3% by weight of the mud. Starch is objectionable because it is subject to biochemical decomposition with the formation of carbon dioxide gas. This causes the mud to froth. Also destruction of the starch increases the water loss properties of the mud. Biochemical action can be suppressed by the addition of algycides, germicides, etc., such as cresylic acid, chlorinated phenols, etc. The use of these materials, however, is objectionable because the cost is high and permanent protection cannot be obtained. However, according to the present invention employing a water dispersible cellulose in the drilling fluid, a bacterial stable drilling fluid may be obtained which will overcome the undesirable feature of the starch.

The preceding discussion on the effectiveness of the flocculating power of sodium salts and calcium salts upon the clays present in production zones is to be regarded only as an example and in a broader sense any of the elements of these same groups are to be regarded as of equal merit. For example, the sodium ion might just as well be substituted by potassium or lithium while the calcium could be substituted by barium, strontium or even magnesium. In a still broader sense, salts of zinc, aluminum, manganese, or iron, might also be used with equally favorable results upon the production zone as might be had with the use of calcium. Then within the scope of this invention are salts of alkaline earth, the earth group and also those cations of elements in the other metallic groups that are soluble in water and are not removed from solution by electrolytic action upon the metallic surfaces used in the drilling operation as might occur with the use of copper salts.

It is thus a further object of this invention to provide for a "combination treatment" of muds comprising the addition of a salt or a mixture of salt to control production zone performance and sufficient methyl cellulose to control the viscosity and water loss of the mud without perceptibly altering its cake-forming properties or desirability as a drilling fluid.

It is another object of this invention to provide a mud that will have a desirable effect upon production zone characteristics without having to use a sufficient quantity of the salt to interfere with electric logging operations. The use of limited amounts of the above described polyvalent salts in the range of 0.01% to 0.5% by weight is effective in flocculating the clays in the production zone to the desired degree.

It is desirable in practicing this invention to improve the performance characteristics of a mud by not employing an amount of treating agent, such as methyl cellulose, in excess of the minimum amount necessary to obtain the desired performance characteristics. If the quantity of the treating agent exceeds this minimum amount in any great excess the mud may be deleteriously affected. Normally methyl cellulose is added in relatively small portions of about 0.5% to 0.8% by weight based upon the weight of drilling fluid treated, although under some circumstances as much as 1.0% by weight or slightly more might be used. By the application of the above described tests it may readily be determined what the necessary amount of treating agent is for any mud.

Before considering the characteristics of the methyl cellulose it should first be emphasized that, as might be expected, naturally occurring clays and the muds prepared from them vary considerably in character. For example, they differ in ultimate chemical composition, in amounts and types of colloidal material, and in amounts and types of impurities. Furthermore, the common contaminants which may become included in the mud during its use in drilling operations, namely, calcium hydroxide leached from cement, and gypsum, differ in type, one being a fairly strong base and the other a neutral salt. As a consequence and in view of the complex character of colloidal dispersions, it is only logical to expect that in general the performance characteristics of muds prepared from clays of different origins or even of the same mud contaminated with different materials, will not necessarily be affected in exactly the same manner by the addition of any given treating agent. In spite of these variations it has been found that the treating agents disclosed herein when added in proper amount will control the performance characteristics of various muds within acceptable limits.

The methods employed for making performance tests have been outlined in detail above. In determining the effect of a treating agent or agents on a mud, the procedure employed in the laboratory has been to add the desired amount of treating agent or agents to the mud followed by a thorough agitation of the mixture for one hour prior to the conducting of the performance tests. It will be observed that such a procedure completely eliminates any necessity for making a chemical analysis of the mud and, as a consequence, it has been found to be the most practical method which can be employed in the field.

As stated above, methyl cellulose has exhibited outstanding ability to reduce water loss. In addition, differing from starch, the methyl cellulose does not have a detrimental effect upon the viscosity of the drilling fluid. In many cases this detrimental effect, which takes the form of a reduction of viscosity, is of no particular consequence. In many other cases, however, it is important to maintain the viscosity of the drilling fluid, and in these cases the use of starch is limited by the amount of reduction in viscosity which is permissible. Methyl cellulose, on the other hand, does not possess the tendency to seriously reduce the viscosity of the mud. As a matter of fact, when excessive amounts of the methyl cellulose are used, the resultant mud becomes too viscous and difficulties in pumping are encountered. It is also of particular interest that the viscosities of drilling fluids are primarily a function of the methyl cellulose content. It is also of importance that the mud weight will play a particularly important role. For best performance these muds should have mud weights not greater than 74 lb./cu. ft. although it is quite possible that certain muds of restricted nature might be capable of performing as desired with mud weights in excess of the amounts indicated.

The water losses of methyl cellulose muds are almost completely controlled by the methyl cellulose content while relatively little effect can be observed by variation in mud source, variation in mud weight between 66 and 78 lb./cu. ft. and variation in salt content between 0% and 5% by weight. While any of the methyl celluloses may be employed as treating agents for drilling fluid, the amount to be employed will vary with the particular grade and source of this material.

The most desirable methyl cellulose employed was the commercial grade methyl cellulose, marked 400 cps., i. e., a 2% dispersion of this material will have a viscosity of 400 centipoises, and is of such a nature that the material when taken up in water will completely disperse to a clear viscous liquid. The viscosity of such an aqueous liquid will vary with the concentration of the methyl cellulose used. Since the marketer prepares several other grades marked low, medium, high, and extra high, which correspond to viscosities of about 25, 50, 100 and 350 centipoises, a rather large number of viscosity effects can be had by the use of the several grades of the treating agent. The lower viscosity grades used to prepare such a salt base drilling fluid give on some occasions insufficient viscosity in the range of desirable water losses while with the higher viscosity grades of methyl cellulose used in salt based muds usually result in desirable viscosities of the finished drilling fluids.

It has also been discovered that the use of water dispersible cellulose derivatives need not necesarily be restricted to salt base drilling fluids but that these dispersible cellulose derivatives might also be used to control water loss to formation in the more conventional water based drilling fluids. In addition these water dispersible cellulose derivatives have been found to exhibit particularly desirable performance characteristics when used in conjunction with a soap comprising an alkali metal or ammonium salt of higher molecular weight carboxylic acids or an oil soluble sulphonic acid used either as an admixture with one another or alone. By the term "alkali metal" it is meant to include lithium, sodium and potassium.

The term "higher molecular weight carboxylic acids" is meant to include those organic compounds of the fatty acid type having more than about 10 carbon atoms per molecule such as for example, oleic acid, palmitic acid, linoleic acid, etc. It is also meant to include those other carboxylic acids having more than about 10 carbon atoms and closely related to the fatty acids such as, for example, the naphthenic acids and the rosin acids such as abietic acid.

The "sulfonic acids of relatively high molecular weight" employed to prepare the oil-soluble alkali metal and ammonium salts may be those synthetically produced or those obtained from the treatment of petroleum fractions. The latter are formed when lubricating oil fractions or similar petroleum fractions are treated with concentrated or fuming sulfuric acid. The so-called "mahogany acids" dissolve in the oil phase, whereas the so-called "green acids" are the water-soluble organic acids which pass into the sludge. After separation of the sludge the "mahogany acids" which are preferred may be recovered in the form of sodium salts by treatment of the acid-treated oil with sodium hydroxide to produce the sodium sulfonates which are then subsequently removed from the oil solution by extraction with alcohol. The other alkali metal salts and the ammonium salts may be obtained from the above sodium salts by well known processes of metathesis. An example of a commercially available oil-soluble alkali metal salt of a higher molecular weight sulfonic acid is a concentrate in lubricating oil, comprising about 60% sodium sulfonates and 40% lubricating oil.

Desirably, but not necessarily, the treating agent selected from the group comprising the alkali metal and ammonium salts of higher molecular weight carboxylic acids and oil-soluble sulfonic acids, may be dispersed in a petroleum or other hydrocarbon oil such as spray oil, a transformer oil extract produced by Edeleanu extraction of a suitable petroleum distillate with sulfur dioxide, a light lubricating oil or even a heavy lubricating oil, prior to introduction into the drilling fluid. The effect of these petroleum hydrocarbons upon performance characteristics of the drilling fluid is shown in several ways. The light hydrocarbons of the kerosene range to the spray oil range are shown to have a marked tendency to reduce the foaming character of soap containing drilling fluids. At the same time, these drilling fluids containing these lighter hydrocarbons show relatively little improvement in water loss to formation as may be indicated by test. The inclusion, however, of the hydrocarbons of the extract type such as Edeleanu extraction product obtained in the refining of lubricating oils or other such processes, have a marked tendency to reduce the water loss to formation of the compounded drilling fluid. In addition such materials as crude oil or asphaltenes might be stabilized in the drilling mud to give equally as favorable results. It is also of importance that major proportions of these extract materials contained in the drilling muds can be stabilized in drilling fluids with the aid of the previously described soaps to result in an emulsion of soap, hydrocarbon, suspending agent, and water of which extremely small amounts of water are lost to the formation.

It has further been discovered that the alkali metal and ammonium acid and neutral salts of the various acids of phosphorus such as ortho phosphoric acid, pyrophosphoric acid, hexametaphosphoric acid, etc., when added to drilling fluids in conjunction with a treating agent selected from each of the classes of compounds disclosed hereinabove or only from the first named class of compounds disclosed hereinabove, particularly when the drilling fluid is contaminated with cement or similar materials yielding polyvalent metal ions, results in performance characteristics which are better than can be obtained by the use of these materials alone.

In the usual field operations, it is often necessary to form a cement plug in the hole and to subsequently drill through this plug, thereby contaminating the mud with cement. Mud which has been contaminated with cement is termed "cement-cut mud." It has been observed that such muds usually possess poor performance characteristics in accordance with the quality definitions given hereinabove and that the greater the contamination the poorer the quality. Cement-cut muds often become so viscous in character that it is difficult, and often impossible to circulate the contaminated material. This increase in apparent viscosity may impart "gas cutting tendencies" to the muds, that is, prevent the escape of gas from the mud, and tend to prevent the proper release of cuttings therefrom. Further, as will be discussed more fully later, such muds form thick, pervious cakes upon the wall of the hole which permit the ready penetration of water into the formation.

In the past when drilling muds have become contaminated or, in any event, when their apparent viscosities have become undesirably high, it has frequently been the practice to remove the mud from the hole and to dispose of it as useless material. Such practice involved a considerable disposal problem and, furthermore, it entailed considerable expense for the purchase of new mud. It has been the practice in some fields to lower the viscosity of cement-cut muds by the addition of water. In the past this has been highly undesirable inasmuch as such muds normally exhibited excessively high filter rates.

Muds reclaimed by means of chemical treatment, unless properly controlled, will not be of high quality nor will they alleviate the difficulties encountered from the caving of formations. The reason for this is that a treatment which merely controls the viscosity of the mud is insufficient unless attention has also been given to the cake-forming and water-loss properties of the mud and their importance.

It has now been found that drilling muds can be treated with certain reagents which will control both the viscosity and the filtration rate of the mud and that it is possible to add the reagents to the mud either after the contamination has taken place or, in those cases where it is known or expected that the mud is going to be contaminated by undesirable materials, such as for example, when it is anticipated that a cement plug will be drilled through and that the mud will then become contaminated with cement, the reagents can be added to the mud prior to said contamination. This latter type of treatment immunizes the mud against any substantial deterioration in its performance characteristics upon subsequent admixing with the contaminating material, and in some cases it has been found that such contamination after the addition of the reagents which have now been discovered even improves the performance characteristics of the mud. Furthermore, these reagents are so effective in controlling water loss that the viscosity if desired can be controlled merely by the addition of water to the mud either before or after contamination with the cement or similar materials. Illustrative of this point, it has been observed that when mud becomes contaminated with cement its viscosity and filtration rate become undesirably high, but that these factors can be reduced to desirable values by the addition to the contaminated mud of a mixture of concentrate comprising about 60% oil soluble sodium sulfonates in lubricating oil, methyl cellulose and water. On the other hand, by adding the mixture of concentrate comprising about 60% oil soluble sodium sulfonates in lubricating oil, methyl cellulose and water to the mud prior to contamination with cement, the performance characteristics of the mud are improved, and upon the subsequent addition of cement the performance characteristics are still acceptable and in many cases may remain substantially unchanged or may even be improved.

It is desirable in practicing this invention to improve the performance characteristics of a mud not to employ an amount of treating agent or agents in excess of the minimum amount necessary to obtain the desired performance characteristics. If the quantity of reagent exceeds this minimum amount in any great excess the mud may be deleteriously affected. Normally the reagents are added in relatively small proportions in the order of about 0.01% to 2.0% by weight based upon the weight of drilling fluid treated, although under some circumstances as much as 5% by weight or even 10% by weight of some of the reagents may be used. By the application of the above described tests it may readily be determined what the necessary amount of any given reagent or reagents is for any mud.

In the practice of this invention in the field, the treating agents may be conveniently added to the circulating mud stream at a point adjacent to the mud pump suction inlet in the mud sump. Thorough admixture of the thus introduced treating agents may be assured by rapid recirculation of the mud from the mud sump through a spare slush pump. During treatment, mud samples may be taken from the circulating mud stream at frequent intervals and tested in order to determine when the desired degree of treatment has been effected.

The following examples are presented in the nature of illustrations of the practical value of the processes of the invention and are not to be construed as limiting the invention in any sense.

*Example I*

A Santa Maria Valley clay was mixed with water to give a 72 pound per cubic foot mud fluid. To a given volume of this mud fluid was added 1.0% by weight of calcium chloride and varying amounts of methyl cellulose were dispersed and water loss by filtration and viscosities determined on each sample by the procedures already described. The data from these several experiments are given in the following tabulation:

| Treating Agent Added, Percent by Weight of the Final Drilling Fluid | March Viscosity, 500/500, Secs. | Filtration Rate, Ml., 1st 15 Min. |
|---|---|---|
| A. No added treating agent | 23 | 58 |
| B. 0.4% methyl cellulose, 400 cps | 25 | 17.2 |
| C. 0.6% methyl cellulose, 400 cps | 35 | 5.3 |
| D. 0.8% methyl cellulose, 400 cps | 41 | 3.6 |
| E. 1.0% methyl cellulose, 400 cps | 85 | 2.7 |
| F. 0.4% methyl cellulose, low cps | 24 | 17.5 |
| G. 0.6% methyl cellulose, low cps | 25 | 7.4 |
| H. 0.8% methyl cellulose, low cps | 28 | 5.3 |
| I. 0.4% methyl cellulose (high vis.) | 23 | 14.3 |
| J. 0.8% methyl cellulose (high vis.) | 42 | 3.7 |

*Example II*

A Santa Maria Valley clay was mixed with water to give a mud fluid of 72 pounds per cubic foot. To a given volume of this mud fluid was added varying percentages of methyl cellulose and calcium chloride and the water loss by filtration and viscosities determined on each sample by the procedures already described. The data from these several experiments are given in the following tabulation:

| Treating Agent Added, Percent by Weight of the Final Drilling Fluid | March Viscosity, 500/500, Secs. | Filtration Rate, Ml., 1st 15 Min. |
|---|---|---|
| A. No added treating aid. (No calcium chloride) | 38 | 24 |
| B. No added treating aid. 1.0% calcium chloride | 23 | 58 |
| C. 0.4% methyl cellulose 400 cps. (No calcium chloride) | 30 | 17.7 |
| D. 0.6% methyl cellulose 400 cps. (No calcium chloride) | 40 | 5.1 |
| E. 0.4% methyl cellulose 400 cps. 0.5% calcium chloride | 27 | 17.4 |
| F. 0.6% methyl cellulose 400 cps. 0.5% calcium chloride | 36 | 4.9 |
| G. 0.4% methyl cellulose 400 cps. 1.0% calcium chloride | 25 | 17.2 |
| H. 0.6% methyl cellulose 400 cps. 1.0% calcium chloride | 35 | 5.3 |
| I. 0.4% methyl cellulose 400 cps. 1.5% calcium chloride | 26 | 17.6 |
| J. 0.6% methyl cellulose 400 cps. 1.5% calcium chloride | 39 | 5.8 |

*Example III*

A Santa Maria Valley clay was mixed with water to give samples of mud fluids of several mud weights. To a given volume of each mud sample was then added 0.6% by weight of methyl cellulose 400 cps. and 1.0% by weight of calcium chloride and the ingredients dispersed into the mud fluid. Water losses by filtration and viscosities on each sample were then determined by the procedures already described. The data from these several experiments are given in the following tabulation:

| Mud Weight in Pounds per Cubic Foot | March Viscosity, 500/500, Secs. | Filtration Rate, Ml., 1st 15 Min. |
|---|---|---|
| A. 78 | 84 | 6.4 |
| B. 75 | 39 | 6.2 |
| C. 72 | 35 | 5.3 |
| D. 71 | 31 | 5.4 |
| E. 70 | 28 | 5.0 |
| F. 66 | 33 | 4.0 |
| G. 64 | 30 | 4.3 |

*Example IV*

A Santa Maria Valley clay was mixed with water to give a fluid weighing 78.5 pounds per cubic foot. To a given volume of this fluid was added an equal volume of water in which had been dispersed a dispersible cellulose derivative in combination with a soap and the viscosity and filtration rate were determined on each sample by the procedures already described. The data from these several experiments are given in the following tabulations:

| Treating Agent Added, Percent by Weight of the Final Drilling Fluid | March Viscosity, 500/500, Secs. | Filtration Rate, Ml., 1st 15 Min. |
|---|---|---|
| A. No added treating agent | 20 | 34.5 |
| B. 2.0% concentrate comprising about 60% oil soluble sodium sulfonates in lubricating oil | 22 | 3.5 |
| C. 2.0% concentrate comprising about 60% oil soluble sodium sulfonates in lubricating oil; 0.4% Methyl cellulose | 24 | 2.0 |
| D. 0.8% Methyl cellulose | 31 | 2.4 |
| E. 0.7% Hydrated cement | 22 | 44.0 |
| F. 0.7% Hydrated cement; 2.0% concentrate comprising about 60% oil soluble sodium sulfonates in lubricating oil | 22 | 10.0 |
| G. 0.7% Hydrated cement; 2.0% concentrate comprising about 60% oil soluble sodium sulfonates in lubricating oil; 0.4% Methyl cellulose | 24 | 3.0 |
| H. 0.7% Hydrated cement; 0.8% Methyl cellulose | 30 | 2.5 |
| I. 10.0% Phenol extract, (stream #1) 3.0% concentrate comprising about 60% oil soluble sodium sulfonates in lubricating oil | 30 | 0.7 |

The drilling fluid described in Example I-A comprises a mixture of Santa Maria Valley clay and water. Although possessing an acceptable viscosity, it has such a high filtration rate that it would normally not be used in drilling operations. The addition of 0.6% and 0.8% by weight of methyl cellulose in various grades to this mud fluid resulted in a drilling fluid of desirable characteristics. The use of 0.4% by weight of methyl cellulose in these various grades to this mud fluid, however, still results in a mud fluid of excessively high filter rates. Of the various grades of methyl cellulose chosen, the 400 cps. methyl cellulose used in these examples, has somewhat better performance characteristics than the other grades.

Example II-B shows the effect on performance characteristics of adding calcium chloride in quantity to the drilling fluid of Example II-A. Example II-F, II-H, and II-I show that methyl cellulose alone is effective in maintaining the performance characteristics of the drilling fluid. These samples show that the quantity of calcium chloride used has little effect upon viscosity and water loss by filtration. Thus, small amounts, i. e., 0.5% or less of calcium chloride may be used in muds which have a beneficial effect in permitting taking electric logs of the well. Examples II-C, II-E, II-G, and II-I, also show that the methyl cellulose content must be maintained at a point sufficiently high or inferior water loss of the compounded mud will occur.

Example III shows the effect on performance characteristics of the mud weight of a drilling fluid mud from a Santa Maria mud. These examples show that mud weight has relatively little effect upon the viscosity and water loss by filtration characteristics of the mud except when the 78 pound per cubic foot drilling fluid was used. These examples also show that the water losses by filtration become progressively worse as the mud weights increase. For best performance the mud weight has been maintained not in excess of 72 pounds per cubic foot by weight of the drilling fluid.

Example IV-A shows that an untreated Santa Maria Valley clay and water suspension possesses an acceptable viscosity, but allows a high filtration rate. The addition of 2.0% by weight of concentrate comprising about 60% oil soluble sodium sulfonates in lubricating oil gave a drilling fluid having acceptable performance characteristics (Example IV-B). However, even better performance characteristics were obtained by using methyl cellulose, or a combination of a concentrate comprising about 60% oil-soluble sodium sulfonates in lubricating oil with methyl cellulose. As is shown by Examples IV-C and IV-D: Example IV-E shows that cement has an extremely undesirable effect upon a Santa Maria Valley clay and water suspension. However, the addition of 2.0% concentrate comprising about 60% oil soluble sodium sulfonates in lubricating oil to the drilling fluid is capable of offering improvement, Example IV-F. The examples also show that in the presence of cement even better results are obtainable if the concentrate comprising about 60% oil soluble sodium sulfonates in lubricating oil is used in combination with methyl cellulose or even methyl cellulose alone (Examples IV-G and IV-H).

Other modifications of this invention which would occur to one skilled in the art may be made, and these are to be considered within the scope of the invention as defined in the following claims.

We claim:

1. A drilling fluid comprising water, clay, and between about 0.01% and 10% by weight of water dispersible methyl cellulose.

2. A drilling fluid comprising water, clay, between about 0.01% and 5% by weight of a dissolved inorganic salt, and between about 0.01% and 10% by weight of water dispersible methyl cellulose.

3. A drilling fluid according to claim 2 in which the salt is a salt of a monovalent metal.

4. A drilling fluid according to claim 2 in which the salt is a salt of a polyvalent metal.

5. A drilling fluid according to claim 2 in which the salt is a salt of an alkaline earth metal.

6. A drilling fluid comprising water, a clay, 0.01% to 0.5% by weight of a water soluble calcium salt and about 0.01 to 1% of methyl cellulose.

7. A drilling fluid comprising water, a clay, 0.01% to 0.5% by weight of a water soluble zinc salt and about 0.01 to 1% of methyl cellulose.

8. A drilling fluid comprising water, a clay, 0.01% to 0.5% by weight of a water soluble aluminum salt and about 0.01 to 1% of methyl cellulose.

9. A drilling fluid comprising water, clay, between about 0.01% and 10% by weight of an alkali metal soap and between about 0.01% and 10% by weight of water dispersible methyl cellulose.

10. A drilling fluid according to claim 9 in which the soap is a salt of an oil soluble petroleum sulfonic acid.

11. A drilling fluid comprising water, clay, between about 0.01% and 10% by weight of an alkali metal salt of an oil-soluble petroleum sulfonic acid, between about 0.01% and 10% by weight of water dispersible methyl cellulose, and a light hydrocarbon in an amount between about 0.8% and 11.2%, sufficient to reduce the foaming of the fluid.

12. A drilling fluid according to claim 11 which contains a sufficient amount between about 0.8% and 11.2% of a hydrocarbon of the Edeleanu extract type to reduce the filter loss to a volume not greater than 45 ml. in the first hour.

13. A drilling fluid according to claim 1 in which the drilling fluid contains between 0.01 and 0.5% by weight of a dissolved calcium salt, and between 0.01 and 1% of methyl cellulose.

14. A drilling fluid according to claim 1 in which the drilling fluid contains between about 0.8% and 11.2% by weight of an oil and between 0.01% and 5% of an oil soluble salt of petroleum sulfonic acids.

15. A drilling fluid comprising an emulsion containing water, clay, and between 0.01 and 10% of water dispersible methyl cellulose, between 0.01 and 10% of an oil soluble salt of petroleum sulfonic acids, and a sufficient amount of oil of the Edeleanu extract type to form an emulsion containing a major proportion of oil.

16. A method for increasing the productivity of an oil well which comprises using during the drilling of said well through the oil producing formation a drilling fluid comprising water, clay, a sufficient amount of a dissolved polyvalent metal salt to flocculate said clay, and a sufficient amount of water dispersible methyl cellulose to reduce the filtration rate to a value not greater than about 45 ml. per hour, whereby the small amount of filtrate which is lost from the fluid to the producing formation will increase the effective permeability of the producing formation.

References Cited in the file of this patent

UNITED STATES PATENTS

| Number | Name | Date |
|---|---|---|
| 1,819,646 | Loomis et al. | Aug. 18, 1931 |
| 2,073,413 | Cross et al. | Mar. 9, 1937 |
| 2,129,913 | Cross et al. | Sept 13, 1938 |
| 2,151,029 | Henst | Mar. 21, 1939 |
| 2,304,256 | Heubel | Dec. 8, 1942 |
| 2,331,049 | Schindler | Oct. 5, 1943 |
| 2,343,113 | Jones | Feb. 29, 1944 |
| 2,364,434 | Foster | Dec. 5, 1944 |
| 2,365,383 | Bond | Dec. 19, 1944 |
| 2,423,144 | Gregg | July 1, 1947 |
| 2,425,768 | Wagner | Aug. 19, 1947 |
| 2,468,657 | Dyke et al. | Apr. 26, 1949 |
| 2,570,947 | Himel et al. | Oct. 9, 1951 |

OTHER REFERENCES

Bock-Water-Soluble Cellulose Ethers-Article in Industrial and Engineering Chemistry, vol. 29, September 1937, pp. 985–987.

Chaney: A Review of Recent Advances in Drilling-Mud Control. Article in the Oil Weekly, November 23, 1942, pp. 25, 26, 28, 32, 34, 36, 38, 40 and 42.